US005974808A

United States Patent [19]

Mangano et al.

[11] Patent Number: 5,974,808

[45] Date of Patent: Nov. 2, 1999

[54] COOLING APPARATUS EMPLOYING A PRESSURE ACTUATED JOULE-THOMSON CRYOSTAT FLOW CONTROLLER

[75] Inventors: Roy A. Mangano; Werner J. Kroebig, both of Tucson, Ariz.

[73] Assignee: Raytheon Company, Lexington, Mass.

[21] Appl. No.: 08/975,777

[22] Filed: Nov. 21, 1997

[51] Int. Cl.[6] ........................ F25B 19/02

[52] U.S. Cl. ........................ 62/51.2; 251/61.4

[58] Field of Search ........................ 62/51.2; 251/61.4

[56] References Cited

U.S. PATENT DOCUMENTS 4,596,360 6/1986 Cohen ........................ 251/61.4

5,592,822 1/1997 Stubbs ........................ 62/51.2

*Primary Examiner*—Ronald Capossela

*Attorney, Agent, or Firm*—David W. Collins; Leonard A. Alkov; Glenn H. Lenzen, Jr.

[57] ABSTRACT

A pressure activated flow controller for use with a Joule-Thomson valve having a diaphragm actuator that is located outside a dewar, and which is not cooled. The diaphragm actuator limits flow based on gas pressure supplied to the dewar from a gas supply, not temperature, and does not impede cooldown of a device coupled to the dewar. The diaphragm actuator comprises a diaphragm and load plate that exert a force to open the Joule-Thomson valve. A wave spring provides a force to close the Joule-Thomson valve, thus balancing the back pressure of the gas supply. The diaphragm actuator is compact, and limits flow based on gas supply pressure, not temperature. The present invention thus uses pressure regulation instead temperature regulation to achieve flow control.

12 Claims, 1 Drawing Sheet

GAS SUPPLY
16
18
17
27a
27b
23
23
22
21a
21
20
21b
24
26
25
14
15
12
12b
12a
11
10
SENSOR
13
30

COOLING APPARATUS EMPLOYING A PRESSURE ACTUATED JOULE-THOMSON CRYOSTAT FLOW CONTROLLER

BACKGROUND

The present invention relates generally to Joule-Thomson valve flow controllers, and more particularly, to a pressure activated Joule-Thomson valve flow controller.

The assignee of the present invention manufactures missile systems that use a focal plane array infrared sensor that requires cooling to approximately 90° K. The temperature of the focal plane array and infrared sensor must be maintained within a few tenths of a degree Kelvin for precise target acquisition. Joule-Thomson coolers using argon or nitrogen gas are employed to cool the focal plane array infrared sensor.

Development of ultra fast cooldown cryostats by the assignee of the present invention has lead to a need for an actuator/flow controller that is compatible therewith. The flow controller is required to permit high flow during cooldown, and reduce flow once cooldown temperature is reached, while permitting a low flow to maintain the temperature of the focal plane array infrared sensor.

Currently available Joule-Thomson valve flow controllers incorporate temperature sensitive devices to control flow. This requires that a temperature sensor or actuator to be located at the cold end of the cryostat. In the case of a Carleton-type design, gas filled bellows are located at the cold end of the cryostat. The bellows collapse as they cool down with the cryostat and dewar assembly. Upon collapse, a valve is closed to limit flow.

One patented valve flow controller developed by the assignee of the present invention incorporates a temperature sensitive snap disk. The snap disk is a bimetallic, and has a convex curvature at room temperature. When cooled down to approximately 90° K, the disk snaps into a concave shape, which, when coupled to a valve system, reduces flow.

In both of the above-described cases, the actuator device must cool to the required (approximately 90° K) temperature before valve closure occurs. These devices rob the cryostat of performance due to the mass of the device (specific heat), which also needs to be cooled to the required temperature.

Accordingly, it is an objective of the present invention to provide for a pressure activated Joule-Thomson valve flow controller.

SUMMARY OF THE INVENTION

To meet the above and other objectives, the present invention provides for a pressure activated Joule-Thomson valve flow controller having a diaphragm actuator that is located outside a dewar, and which is not cooled. The diaphragm actuator is compact, and limits flow based on gas pressure supplied to the cryostat, not temperature, and does not impede cooldown of a device within or coupled to the dewar. A wave spring provides a force to close the valve, thus balancing the back pressure of the gas supply. The design of the present invention varies from current design technologies in that it utilizes pressure regulation instead of temperature regulation to achieve flow control.

Various missiles currently produced by the assignee of the present invention that would benefit from using the present invention are those that require ultra fast cooldown of a focal plane array infrared sensor in a time frame of from 3 to 10 seconds. However, it is to be understood that the diaphragm actuator may be used on any system, whether it requires fast cooldown or not. With the ability to regulate (reduce) flow once cooldown temperature is reached, the diaphragm actuator can be used with any system for gas conservation, wherein the reduced flow requirements lengthens the supply time provided by the gas supply.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
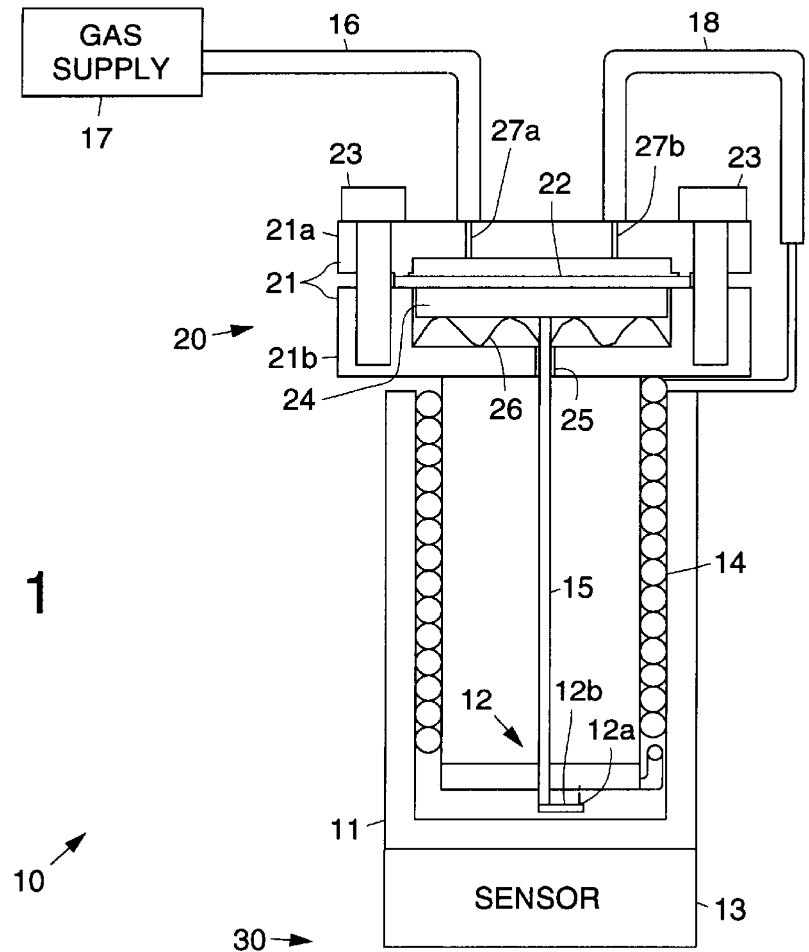
FIG. 1 illustrates a cross sectional view of a pressure controlled flow actuator in accordance with the principles of the present invention.

Referring to the drawing figures, FIG. 1 illustrates a cross sectional view of cooling apparatus 10 comprising a pressure controlled flow actuator 10 or controller 10 in accordance with the principles of the present invention. The pressure controlled flow actuator 10 comprises a dewar 11 having a Joule-Thomson valve 12 (orifice 12*a* and stem 12*b*) located at one end thereof that is disposed adjacent to a sensor 13, such as a focal plane array infrared sensor 13 used in a missile 30, for example. A heat exchanger 14 is disposed within the dewar 11.

The Joule-Thomson valve 12 is coupled by way of an actuator stem 15 to a diaphragm actuator 20 or flow controller 20 in accordance with the principles of the present invention. The diaphragm actuator 20 is physically located outside of the dewar 11 at an end distal from the Joule-Thomson valve 12 and sensor 13. The diaphragm actuator 20 is comprised of a housing 21 having first and second portions 21*a*, 21*b* that secure a diaphragm 22 therebetween. The first and second portions 21*a*, 21*b* of the housing 21 may be secured together using a plurality of machine screws 23, for example.

A load plate 24 is disposed within the housing 21 adjacent to the diaphragm 22. A wave spring 26 is disposed between the load plate 24 and the second portion of the housing 21*b*. The actuator stem 15 is disposed through an opening 25 in the second portion of the housing 21*b* and is connected to the load plate 24.

A gas supply connection 16 is coupled between a gas supply 17 and an inlet 27*a* to the first portion 21*a* of the housing 21 so that a gas, such as argon or nitrogen, for example, or any gas whose temperature is below the Joule-Thomson inversion temperature, may be coupled into the interior of the housing 21 to pressurize the diaphragm 22. A gas outlet line 18 is coupled between an outlet 27*b* from the interior of the housing 21 and the heat exchanger 14.

Figure 2:
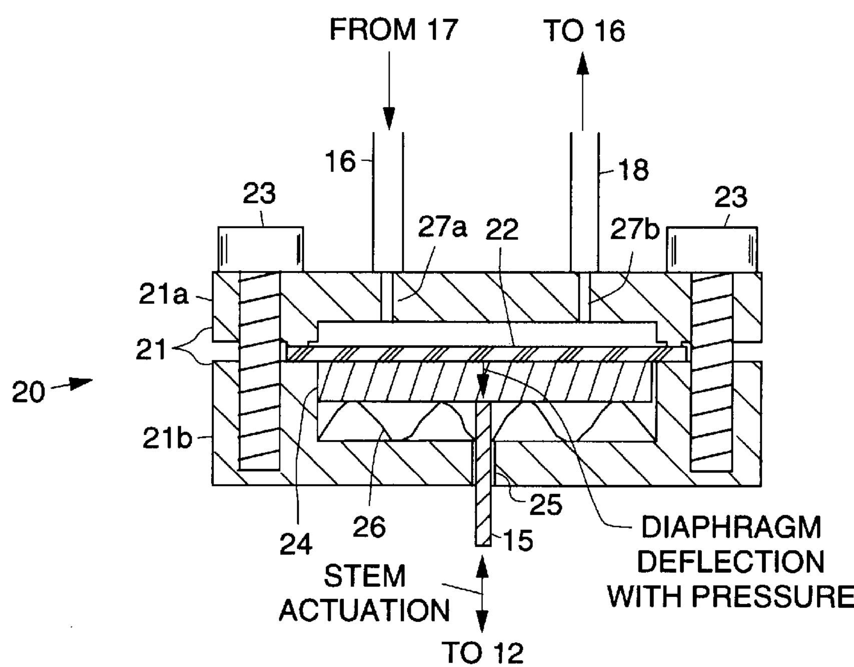
FIG. 2 illustrates diaphragm displacement caused by pressure in the flow actuator of FIG. 1.

FIG. 2 illustrates diaphragm displacement caused by pressure in the flow actuator 10 of FIG. 1. FIG. 2 is an enlarged cross sectional view of the diaphragm actuator 20 of the flow actuator 10. As is shown in FIG. 2, gas is supplied from the gas supply 17 by way of the inlet 27*a* to the first portion 21*a* pressurizes the interior of the housing 21.

The sensor 13 on the missile 30 requires cooling to approximately 90° K, with little or no temperature excursions for target acquisition. The Joule-Thomson valve 12 and the present diaphragm actuator 20 are used to cool the sensor 13. During a cooldown cycle, a high flow rate of cooling gas is required to quickly cool the sensor 13. Once cooldown is reached, the flow rate needs to be reduced to maintain the requisite temperature, but not exhaust the gas contained in the gas supply 17. The present diaphragm actuator 20 or flow controller 20 regulates the gas flow rate. In the present invention, the diaphragm actuator 20 is located outside the dewar 11, and limits the gas flow rate based on the gas pressure in the gas supply 17. The pressure in the gas supply 17 supplies the opening force, and the wave spring 26 applies a load equivalent to the required closing pressure.

The use of conventional temperature sensitive control device to regulate gas flow places an unnecessary burden on cryostats that use them. The present pressure actuated flow controller 20 eliminates this burden and locates the flow controller 20 outside of the dewar 11). Gas supply pressure applies a load on the diaphragm 22, which in turn causes the diaphragm 22 to deflect downward (in the drawing figures) to open the Joule-Thomson valve 12. The wave spring 26 applies a load in the upward direction, which translates to a pressure when distributed across the load plate 24. As the pressure in the gas supply 17 decays (the pressure decrease resulting from gas blowdown), the load applied by the pressure in the gas supply 17, and the load applied by the wave spring 26, reach equilibrium. As pressure bleeds down further, the load supplied by the wave spring 26 overcomes the load resulting from pressure supplied by the gas supply 17, and the Joule-Thomson valve 12 closes. The force balance is achieved that is given by the equation:

$$P_{gs}=F_{ws}/A_{lp},$$

wherein $P_{gs}$ is the pressure supplied by the gas supply 17, $F_{ws}$ is the force exerted by the wave spring 26, and $A_{lp}$ is the area of the load plate 24.

Therefore, the wave spring 26 is selected to provide the closing force required to close the Joule-Thomson valve 12 when cooldown is reached. The wave spring 26 may be varied for the specific design of the pressure controlled flow actuator 10, mission, and configuration, and may be selected to match a particular cooldown profile in order to match temperature as a function of pressure.

Thus, cooling apparatus comprising a pressure activated Joule-Thomson valve flow controller has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A cooling apparatus comprising:

a dewar;

a Joule-Thomson valve located at one end of the dewar;

a heat exchanger disposed within the dewar;

a diaphragm actuator disposed outside of and coupled to the dewar at an end distal from the Joule-Thomson valve that comprises a housing that secures a diaphragm in its interior, a load plate disposed adjacent to the diaphragm, and a wave spring disposed between the load plate and the housing;

an actuator stem disposed through an opening in the housing that is connected between the load plate and the Joule-Thomson valve;

a gas supply is coupled to the housing for coupling a gas into the interior of the housing to pressurize the diaphragm; and a gas line is coupled between the interior of the housing and the heat exchanger.

2. The apparatus of claim 1 wherein the gas comprises argon.

3. The apparatus of claim 1 wherein the gas comprises nitrogen.

4. The apparatus of claim 1 wherein the gas comprises a gas whose temperature is below the Joule-Thomson inversion temperature.

5. A pressure controlled flow actuator for use with a Joule-Thomson cryostat comprising a dewar, a Joule-Thomson valve located at one end of the dewar, and a heat exchanger disposed within the dewar, wherein the improvement comprises:

a diaphragm actuator disposed outside of and coupled to the dewar at an end distal from the Joule-Thomson valve that comprises a housing that secures a diaphragm in its interior, a load plate disposed adjacent to the diaphragm, and a wave spring disposed between the load plate and the housing;

an actuator stem disposed through an opening in the housing that is connected between the load plate and the Joule-Thomson valve;

a gas supply is coupled to the housing for coupling a gas into the interior of the housing to pressurize the diaphragm; and a gas line is coupled between the interior of the housing and the heat exchanger.

6. The apparatus of claim 5 wherein the gas comprises argon.

7. The apparatus of claim 5 wherein the gas comprises nitrogen.

8. The apparatus of claim 5 wherein the gas comprises a gas whose temperature is below the Joule-Thomson inversion temperature.

9. A pressure controlled flow actuator for use with a system having a valve and a heat exchanger, said flow actuator comprising:

a diaphragm actuator that comprises a housing that secures a diaphragm in its interior, a load plate disposed adjacent to the diaphragm, and a wave spring disposed between the load plate and the housing;

an actuator stem disposed through an opening in the housing that is connected between the load plate and the valve;

a gas supply is coupled to the housing for coupling a gas into the interior of the housing to pressurize the diaphragm; and a gas line is coupled between the interior of the housing and the heat exchanger.

10. The apparatus of claim 9 wherein the gas comprises argon.

11. The apparatus of claim 9 wherein the gas comprises nitrogen.

12. The apparatus of claim 9 wherein the gas comprises a gas whose temperature is below the Joule-Thomson inversion temperature.

* * * * *